United States Patent
Lee et al.

(10) Patent No.: US 7,050,369 B2
(45) Date of Patent: May 23, 2006

(54) METHOD OF COMBINING NEWLY ESTABLISHED ENTRIES WITH ORIGINAL ENTRIES FOR UPDATING A DEFECT TABLE WHEN AN OPTICAL DISC DRIVE STOPS WRITING DATA INTO AN OPTICAL DISC

(75) Inventors: Ming-Hung Lee, Taipei Hsien (TW); Shu-Fang Tsai, Hsin-Chu (TW)

(73) Assignee: MediaTek Inc., Hsin-Chu (TW)

( * ) Notice: Subject to any disclaimer, the term of this patent is extended or adjusted under 35 U.S.C. 154(b) by 402 days.

(21) Appl. No.: 10/065,768

(22) Filed: Nov. 18, 2002

(65) Prior Publication Data
US 2003/0223327 A1 Dec. 4, 2003

(30) Foreign Application Priority Data
May 28, 2002 (TW) ................................ 91111375 A

(51) Int. Cl.
*G11B 7/45* (2006.01)
(52) U.S. Cl. .................................. 369/47.14; 369/53.17
(58) Field of Classification Search ............. 369/47.14, 369/53.12, 53.13, 53.15, 53.17
See application file for complete search history.

(56) References Cited

U.S. PATENT DOCUMENTS

| | | | | |
|---|---|---|---|---|
| 4,774,700 A | * | 9/1988 | Satoh et al. | 369/47.14 |
| 5,132,956 A | * | 7/1992 | Ichikawa | 369/53.17 |
| 5,235,585 A | * | 8/1993 | Bish et al. | 369/53.17 |
| 5,271,018 A | * | 12/1993 | Chan | 369/30.07 |
| 5,319,627 A | * | 6/1994 | Shinno et al. | 369/47.14 |
| 5,715,221 A | * | 2/1998 | Ito et al. | 369/47.14 |
| 6,408,408 B1 | * | 6/2002 | Ko | 369/53.17 |
| 6,453,384 B1 | * | 9/2002 | Park et al. | 369/53.17 |

\* cited by examiner

Primary Examiner—Brian E. Miller
Assistant Examiner—Peter Vincent Agustin
(74) Attorney, Agent, or Firm—Winston Hsu

(57) ABSTRACT

A method for managing data on an optical disc includes two different memory areas allocated in the memory of an optical disc drive, one is used to temporarily store an original defect table from the optical disc, the other is used to temporarily store new used-entries established during a data write-in. All newly established used-entries are sorted and stored in the same memory area but remain separate from the used-entries in the original defect table in the other memory area. Only when the optical disc drive stops accessing data, all used-entries in the two memory areas are combined and sorted, which results in an updated defect table written back onto the optical disc.

13 Claims, 15 Drawing Sheets

METHOD OF COMBINING NEWLY ESTABLISHED ENTRIES WITH ORIGINAL ENTRIES FOR UPDATING A DEFECT TABLE WHEN AN OPTICAL DISC DRIVE STOPS WRITING DATA INTO AN OPTICAL DISC

BACKGROUND OF INVENTION

1. Field of the Invention

This invention provides a method of managing and storing addresses of defective data blocks on an optical disc, which during data access sorts only the addresses of new defects, to be combined and sorted with all of the defects on an optical disc when data is no longer being accessed.

2. Description of the Prior Art

Optical discs, given their compact size, high capacity storage, and low price, have rapidly become one of the most dominant, non-volatile storage media in the contemporary information society. The development of a CD-R has made it possible for users to write data onto optical discs in accordance with their own specific needs, which affords the CD-R a high degree of application flexibility.

It is necessary to have an optical disc drive before reading and writing data onto an optical disc. Please refer to FIG. 1 that shows a typical optical disc drive 10. The optical disc drive 10 comprises a holder plate 14 to carry an optical disc 22, a motor 12 that drives the holder plate 14, a read/write head 16 that accesses data on the optical disc 22, a control circuit 18 that controls the operation of the optical disc drive 10, and a memory 20, such as Dynamic Random Access Memory (DRAM), that serves as a temporary storage device to record all relevant data during the operation of the control circuit 18.

The data on the optical disc 22 is recorded sequentially onto a track 24 through pit and land markings. When the optical disc drive 10 is ready to write data onto the optical disc 22, first the optical disc drive 10 stores the intended data in the memory 20 before writing the intended data onto the optical disc 22. The read/write head 16 meanwhile checks for defects in the optical disc 22, and passes the check results back to control circuit 18.

Often due to defects stemming from scratch marks, change of material properties, or interference by micro-dust, data cannot be written onto the optical disc 22. To improve the reliability of a re-writable optical disc (CD-RW), the information technology industry has committed itself to research and development optical disc defect management, for instance, with the introduction of a CD-MRW (Compact Disc Mount Rainier re-Writable) format, which sets aside Spare Areas (SA) in an optical disc. When certain areas of the optical disc contain a defect that renders that area unsuitable for data storage, the CD-MRW format redirects the target data for storage to a SA (please refer to FIG. 2A).

FIG. 2A is an illustration of the format for data storage and defect management of the typical optical disc 22. The data-bearing track 24 of the optical disc 22 is divided into several main areas, including a Lead-in Area (LI), a Program Area (PA), and a Lead-Out Area (LO).The LI area and the LO area are used respectively to designate the beginning and end of the track 24. The PA is primarily used to record the data that is to be written onto the optical disc 22. Within the LI area, a Main Table Area (MTA) is established for the storage of a Defect Table (DT). The PA is further divided into a Pre-Gap (P0) area, a General Application Area (GAA), a Secondary Table Area (STA), and a plurality of Data Areas DA(1) to DA(N), and their corresponding Spare Areas, SA(1) to SA(N). The STA is a back up for the DT. Each DA(N) is further divided into a pre-determined number of user data blocks (Bd) and each SA(n) is divided into a pre-determined number of spare data blocks (Bs). The Bds (or Bs) are all of the same data storage capacity and data-writable. For instance, under the CD-MRW format, each Data Area generally has 136*32 data user blocks and each Spare Area has 8*32 spare data blocks.

All data blocks have a fixed address, which is designated by a certain number to identify a location on the track 24. To write user data onto the optical disc 22 as specified in FIG. 2A, the optical drive 10 treats each data block as a basic data unit, writing data onto each data block within a Data Area in an orderly fashion. For example, when every data block in DA(1) comprises user data, any subsequent data would be directed to available data blocks in DA(2) as needed. However, should a data block be defective during a write-in, an available spare data block would become the location for data storage. If the spare data block turns out to be defective as well during the write-in, then another available Bd is located for the original data storage. By applying this format and method of operation, an accurate data write-in is guaranteed, and the data storage capability of the optical disc 22 is nor compromised due to a defective area.

Writing data onto a spare data block to replace a defective data block (which might be a user data block or spare data block) requires a certain mechanism in place to link the address of the defective data block to that of the spare data block. In this case, the Defect Table (DT) is used to record the correlations between the defective data block and the spare data block (Please refer to FIG. 2B). FIG. 2B is an illustration of related data storage in the DT. The DT comprises a plurality of numbered Defect Table Blocks (DTB) to store related data. FIG. 2B illustrates three DTBs, as in DTB(n–i), DTB (n), and DTB(n+1), where "i" may be 1. Every DTB comprises a plurality of entries E, and every E stores a physical block number in the DA(a) that links to another physical block number in the SA(a). As illustrated in FIG. 2B, an address, ranging from DN1 to DN12, represents a location in different data blocks and an address from AN1 to AN18, represents a location in different spare data blocks.

Every DTB corresponds to a spare data area and the number of entries in the DTB equals the number of spare data blocks in the spare area. According to the data storage in every spare data block of the optical disc 22, every entry E comprises a status indicator to signal the status of data storage in the corresponding spare data block. As illustrated in FIG. 2B, a status indicator "U" represents that the entry stores the address of a spare data block that is being used, along with the address for the defective data block. In other words, data originally intended for a defective data block in the optical disc 22 is actually stored in a spare data block that corresponds to the defective data block. This corresponding relationship between the defective data block and the spare data block is recorded in the entry E (which is now called a used entry),with the status indicator "U".

If a spare data block is available (still un-occupied by user data), it can be used to replace any new-found defective data block for storage during a write-in. The address for such an un-occupied spare data block is stored in an entry E, with a status indicator "F" (a free entry). In the unused entry E, the defect data block address is meaningless (because there is no defect data block to link to).

A spare data block could also be defective, and the address of the spare data block is stored in an entry E with the status indicator "D". The entry E used to store the address of a defective spare data block is called an unusable entry E. In combination, all of the entries in the DTB provide the statuses of all the spare data blocks in the optical disc 22.

When the optical disc drive 10 tries to access data on the optical disc 22, it temporarily loads the DT of the optical disc 22 into the memory 20. When the optical disc drive 10 tries to access data on the optical disc 22, the optical disc drive 10 uses the address of each and every user data block (Bd) to access the data it desires. If a Bd turns out to be defective, the optical disc drive 10 then enlists the help of the DT to locate the replacement data block that stores the user data. In this manner, even with defects on the optical disc 22, the optical disc 22 still can store data for read-out.

On the other hand, the optical disc drive 10 writing data onto the optical disc 22 requires updating the DT in temporary storage in memory 20 accordingly. For instance, assume that during the write-in the optical disc drive 10 discovers that a user data block is defective. The optical disc drive 10 then has to locate another unused spare data block for data storage. The optical disc drive 10 locates an unused entry in the DT. The address of an unused spare data block is recorded in the unused entry and the unused entry is changed into a used entry (by changing the status indicator). The address of the defective data block is recorded in the entry, thus storing a complete corresponding relationship between the defective user data block and the spare data block. As a result, the DT temporarily stored in the memory 20 is updated as well. When the optical disc drive 10 stops accessing data on the optical disc 22 (as in the case of ejecting the optical disc 22), the optical disc drive 10 writes the updated DT from the memory 20 onto the optical disc 22. This updated DT provides the reference that the optical disc drive 10 needs when it tries to access data on the optical disc 22 the next time around.

To facilitate searching for a spare data block in replacing a defective data block by the optical disc drive 10, used entries are sorted according to the recorded address of the data blocks. As illustrated in FIG. 2B, in the DA(n) of the track 24 there is an ascending order of addresses of the data blocks DN6, DN7, and DN8, which means DN8>DN7>DN6. If all three of these user data blocks are defective and require replacement by spare data blocks, the DT used-entries that store the addresses for all three data blocks would be sorted out in order as illustrated in the DTB(n) of FIG. 2B. Similarly, the block DTB(n+1) that corresponds to DA(N+1) in the DTB is sorted as well in accordance with the address of DN11 and DN12.

Used entries in the DT, regardless of their locations, are sorted according to the addresses of the defective data blocks with which they correspond. As illustrated in FIG. 2B, in the used entries, there is an ascending order of DN1<DN2<DN6<DN7<DN8<DN11<DN12 among the addresses of defective data blocks. However, there may not exist any specific order among the corresponding addresses of the spare data blocks AN1, AN2, AN6, AN7, AN8, AN11, AN12 in the used entries. With the used entries in order, the optical disc drive 10 is more efficient in accessing data in a given defective data block by tracing to the replacement spare data block through the use of the DT.

As the used entries in the DTB are sorted according to the address of the defect data block, the unused entries in the DTB are sorted as well according to the address of the unused spare data block. For instance, in the DTB(n+1) of FIG. 2B the addresses of spare data blocks stored in the unused entries AN13, AN14, and AN15 have an ascending order of AN13<AN14<AN15. With the unused entries in the DT sorted, the optical disc drive 10 is capable of efficiently searching for an unused spare data block to replace a defective data block. As for the unusable entries, there is no need for sorting.

As mentioned earlier, when the optical disc drive 10 tries to access data on the optical disc 22, the optical disc drive 10 loads the DT from the optical disc 22 into the memory 20 for temporary storage (please refer to FIG. 3 in conjunction with FIG. 2B). FIG. 3 illustrates how the prior art technology loads the DT into the memory 20 for temporary storage. The optical disc drive 10 reads the original DTB structures into the memory 20, as illustrated in FIG. 3. Please notice that in FIG. 3, the allocation of entries is similar to that of the DTB(n) and the DTB(n+1) in FIG. 2B.

As mentioned earlier, if the optical disc drive 10 uncovers a defective data block during write-in, the optical disc drive 10 replaces the defective data block with a spare data block and updates the DT that is temporarily stored in the memory 20 so that the updated DT reflects the latest linkage between the defective blocks and the replacement data blocks.

Please refer to FIG. 4A to FIG. 4C, which illustrate what process the prior art technology employs to update the DT. Suppose during a write-in, the optical disc drive 10 uncovers a defective user data block DN5 in the DA(n), stemming possibly from scratch marks on the optical disc 22 or from damage caused by micro-dust. As illustrated in FIG. 4A, upon uncovering a defective data block (with address DN5), the optical disc drive 10 locates an unused entry Er in the DT which links to an unused spare data block with an address AN13.

As illustrated in FIG. 4B, when the optical disc drive 10 writes data onto the spare data block in AN13 which was meant for the defective data block, the entry Er gets changed to a used entry and the address DN5 of the defective data block is written into the Er, thus establishing a corresponding relationship between the defective data block and the replacement data block. As mentioned earlier, the used-entries, regardless of their location in the DTB, are sorted according to the address of the defective data block. Now the Er has been changed to a used-entry and every used-entry in memory 20 is sorted.

Since the address of the DN5 is smaller than those of DN6, DN7, DN8, DN11, and DN12, the prior art technology would first insert the content of Er into the address that formerly stored the used-entry DN6. Accordingly, the used-entries DN6 and DN7 are moved down one position, and the used-entry DN8 is moved to the DTB(n+1). Similarly, the used-entries in DTB(n+1) also move down. The result of the resorting is illustrated in FIG. 4C, thus completing the DT update. When the optical disc drive 10 stops accessing data on the optical disc 22 (as in the case of ejecting a disc), the DT temporarily stored in the memory 20 is written back onto the optical disc 22.

During the optical disc 22 write-in using the aforementioned prior art technology, upon detecting a new defective data block, the optical disc drive 10 would go about re-shuffling all the existing used-entries in the DT, which in itself is a rather time-consuming process. As illustrated in FIG. 4A to FIG. 4C, every sort moves many entries around. In other words, the memory 20 consumes huge amounts of time in conducting many store/access operations to accomplish a sort, which delays the process of data write-in and thus lowering the efficiency of writing data onto disc-in the process falling short of meeting the high requirement that modern day Information Technology industry expects of optical disc for highly efficient data write-in.

SUMMARY OF INVENTION

The primary objective of the claimed invention is to provide a more efficient way of managing and updating a Defect Table, thus improving the operation efficiency of optical disc drive during data write-in.

The claimed invention includes two different memory areas allocated in the memory of an optical disc drive. One is used to temporarily store the original DT from an optical disc and the other is used to temporarily store new used-entries established during data write-in. During data write-in, all newly established used-entries are sorted and stored in the same memory area but remain separate from the used-entries in the original DT in the other memory area. Only when the optical disc drive stops accessing data (as in the case of ejecting optical disc) are all used-entries in the two memory areas combined and sorted resulting in an updated DT to be written back onto the optical disc. Since the claimed invention does not require sorting all used-entries in the DT during data write-in and only sorts out the newly established used-entries, the accompanying operations by memory during optical disc data write-in are reduced and efficiency is increased for the optical disc drive.

DETAILED DESCRIPTION

Figure 5:
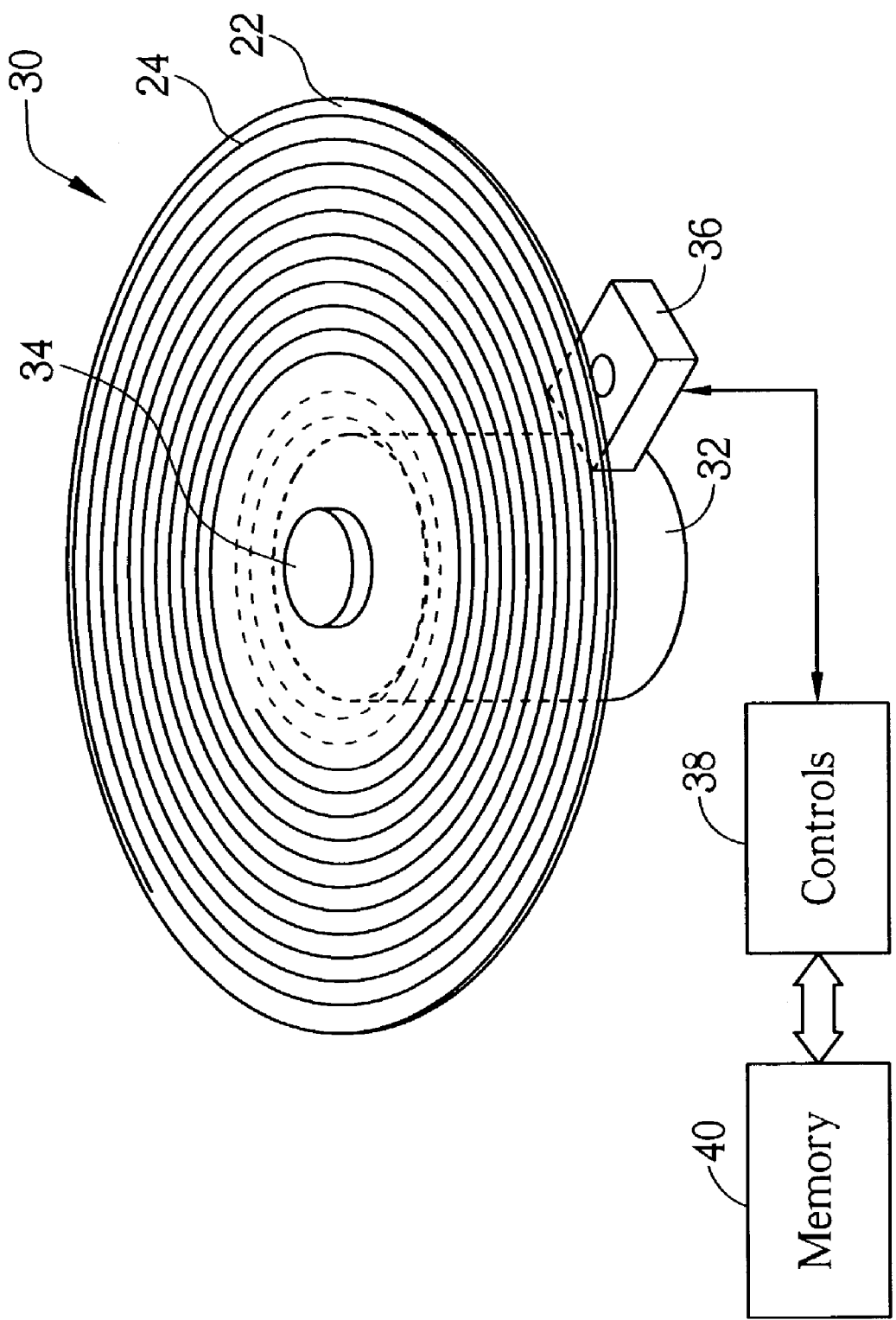
FIG. 5 is an illustration of optical disc drive according to the present invention.

Please refer to FIG. 5, which illustrates a typical optical disc drive 30. The present invention is applicable to the optical disc drive 30, as illustrated in FIG. 5, to manage a DT on the optical disc 22. The optical disc drive 30 comprises a holder plate 34a motor 32 that drives the holder plate 34a read/write head 36 that accesses data on optical disc, a control circuit 38 that manages the operation of the optical disc drive 30, and a memory 40 that provides temporary storage for the control circuit 38 to perform operations on related data. The read/write head 36 of the optical disc drive 30 is capable of detecting a defect on the optical disc 22 during data write-in.

Figure 1:
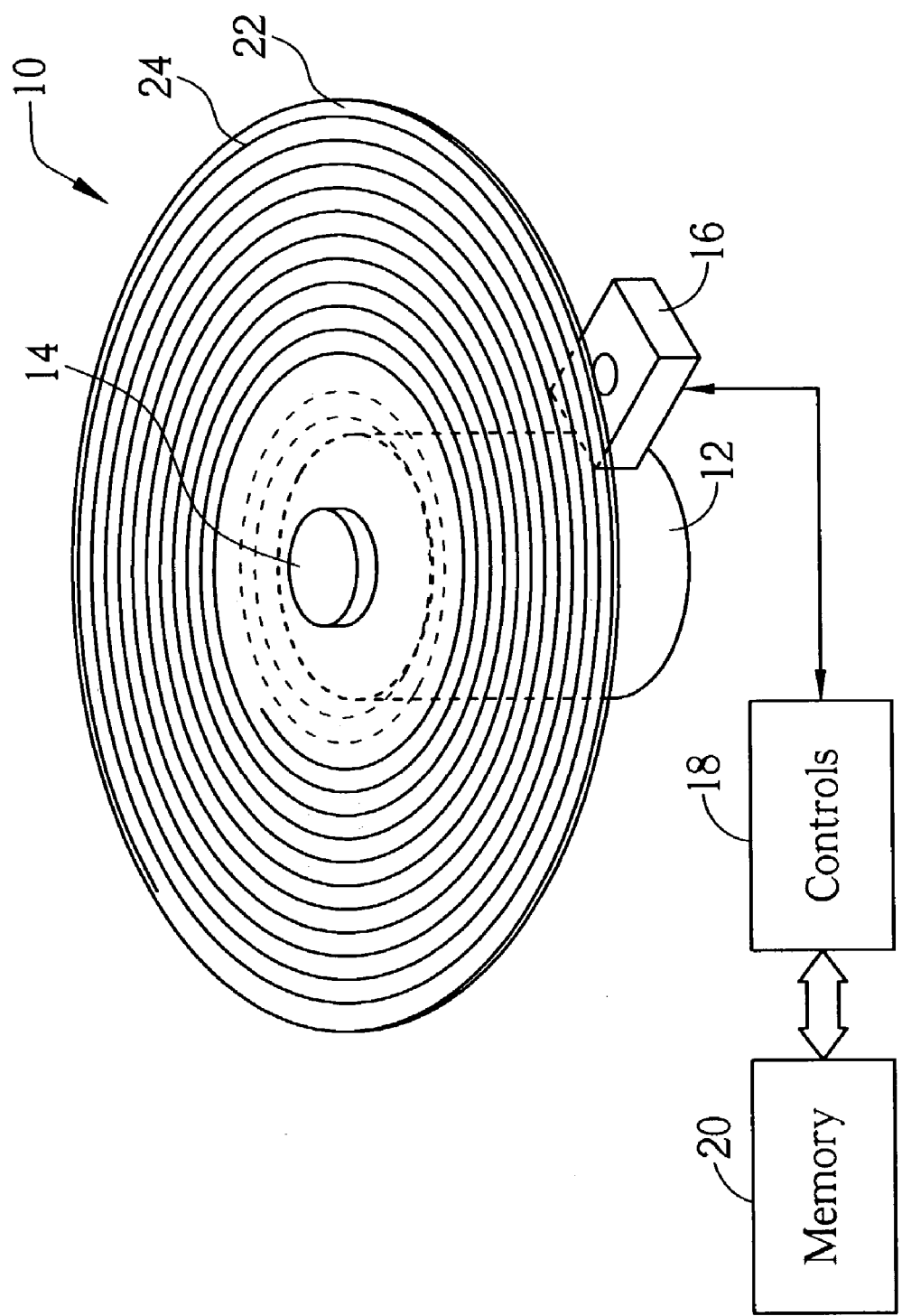
FIG. 1 is a typical optical disc drive illustration.
Figure 2A:
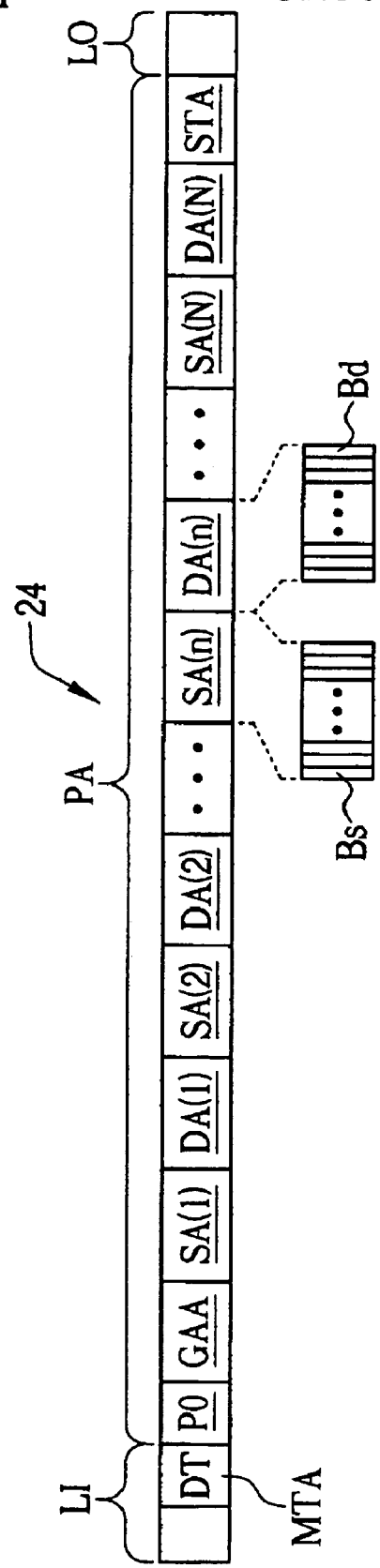
FIG. 2A is a typical illustration of track format on an optical disc.
Figure 2B:
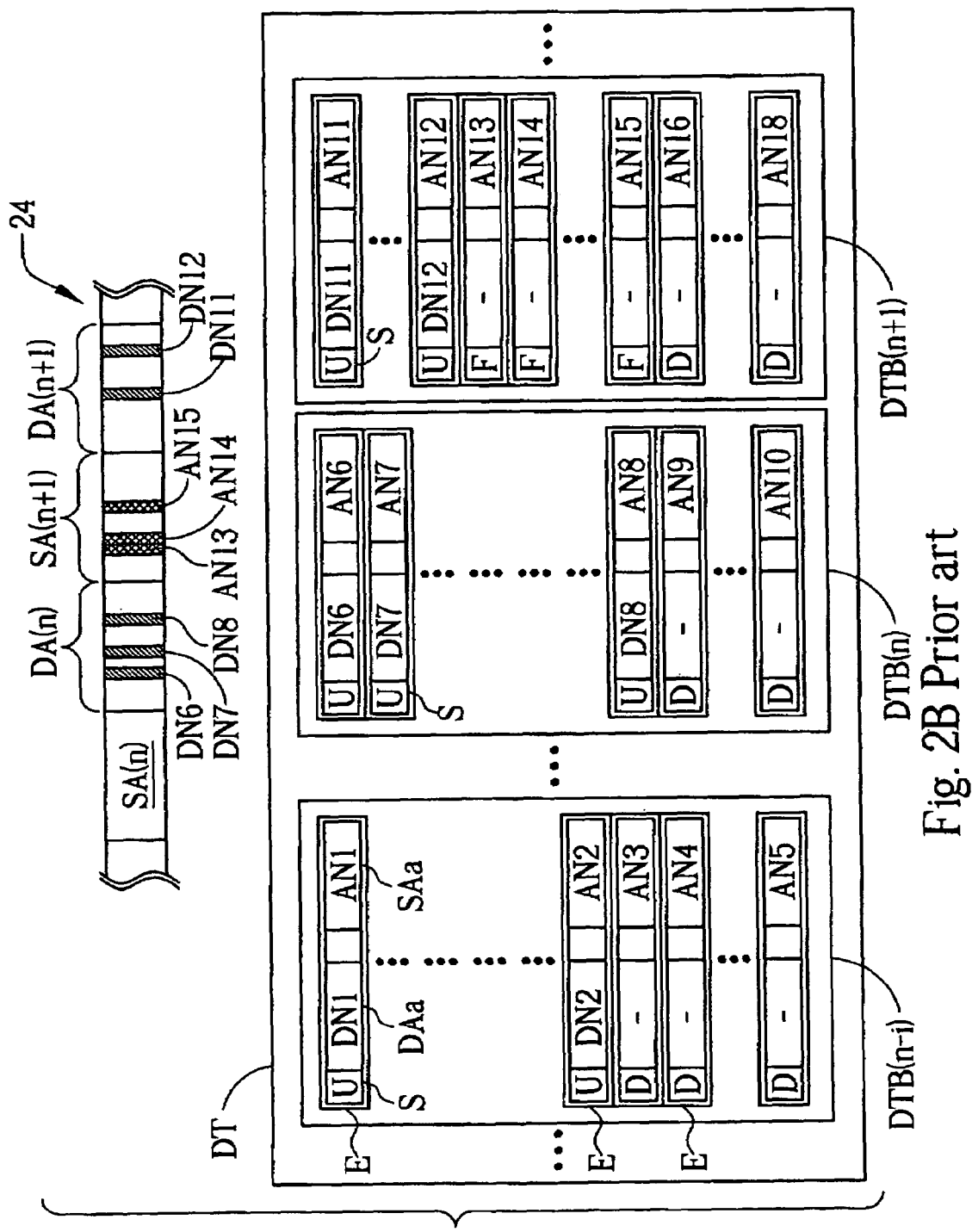
FIG. 2B is an illustration of the Defect Table of FIG. 2A.
Figure 3:
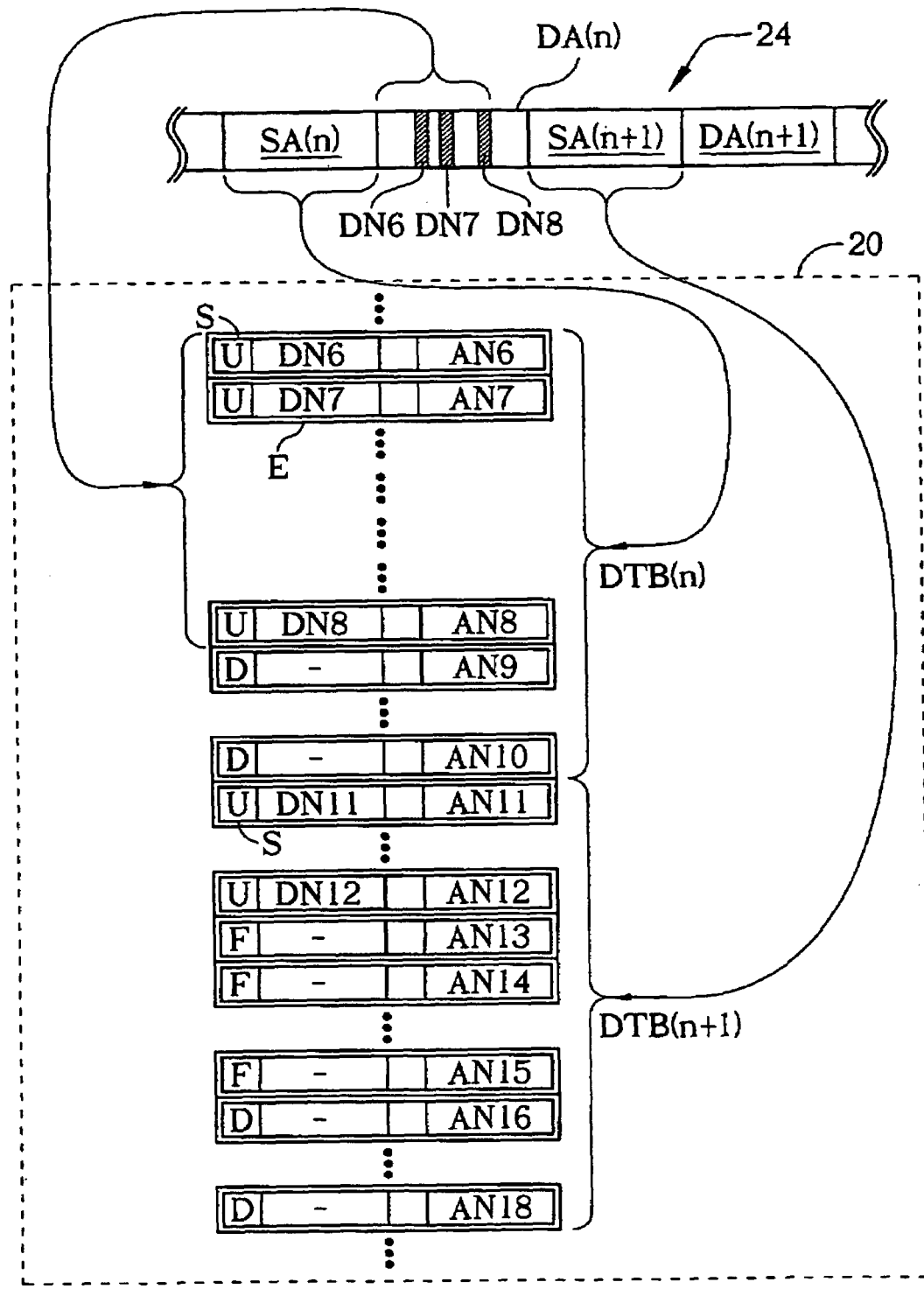
FIG. 3 is an illustration of a Defect Table in the memory of FIG. 1.
Figure 4A:
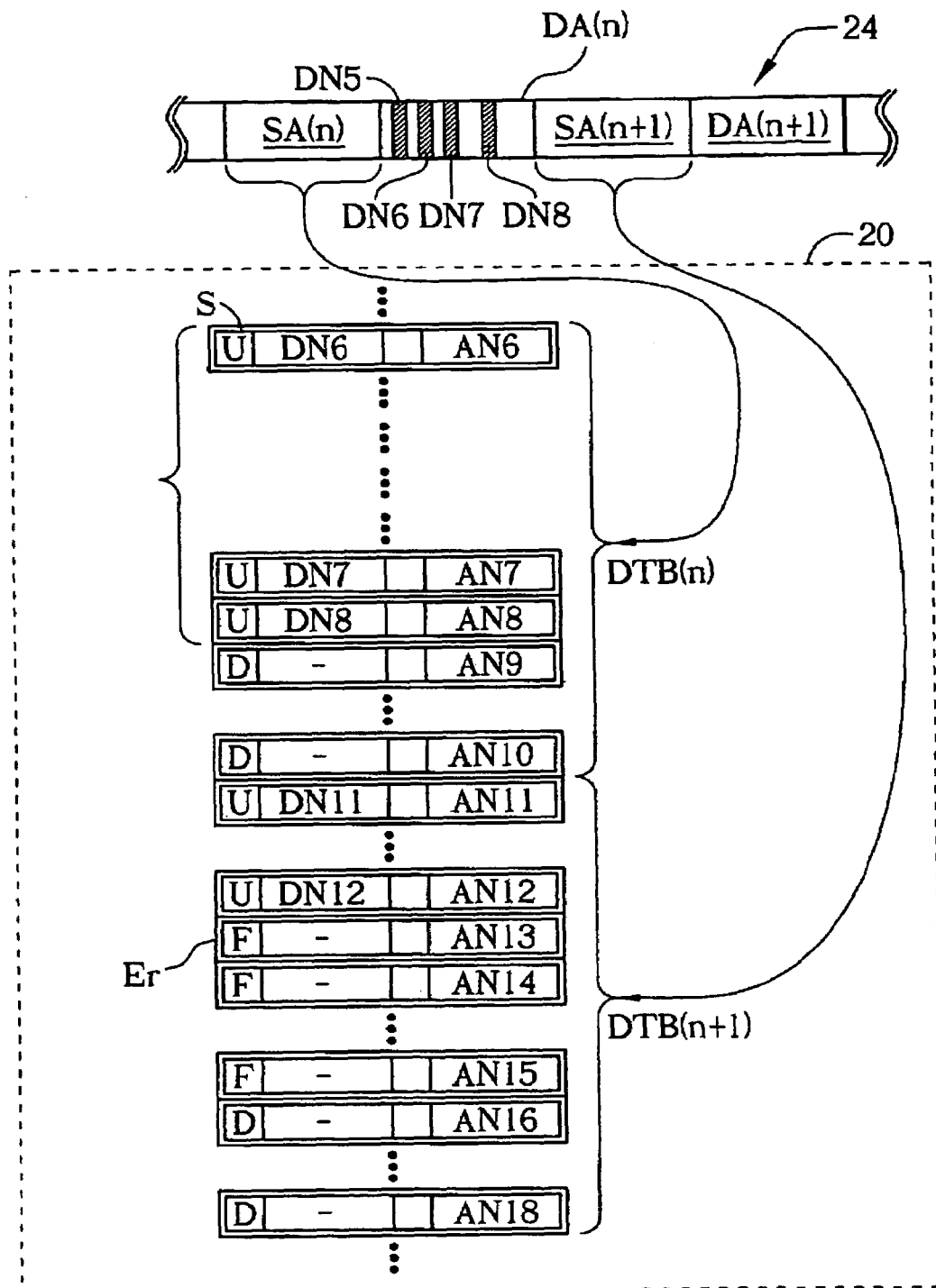
FIG. 4 to FIG. 4C illustrate the process with which prior art technology updates a Defect Table.
Figure 4B:
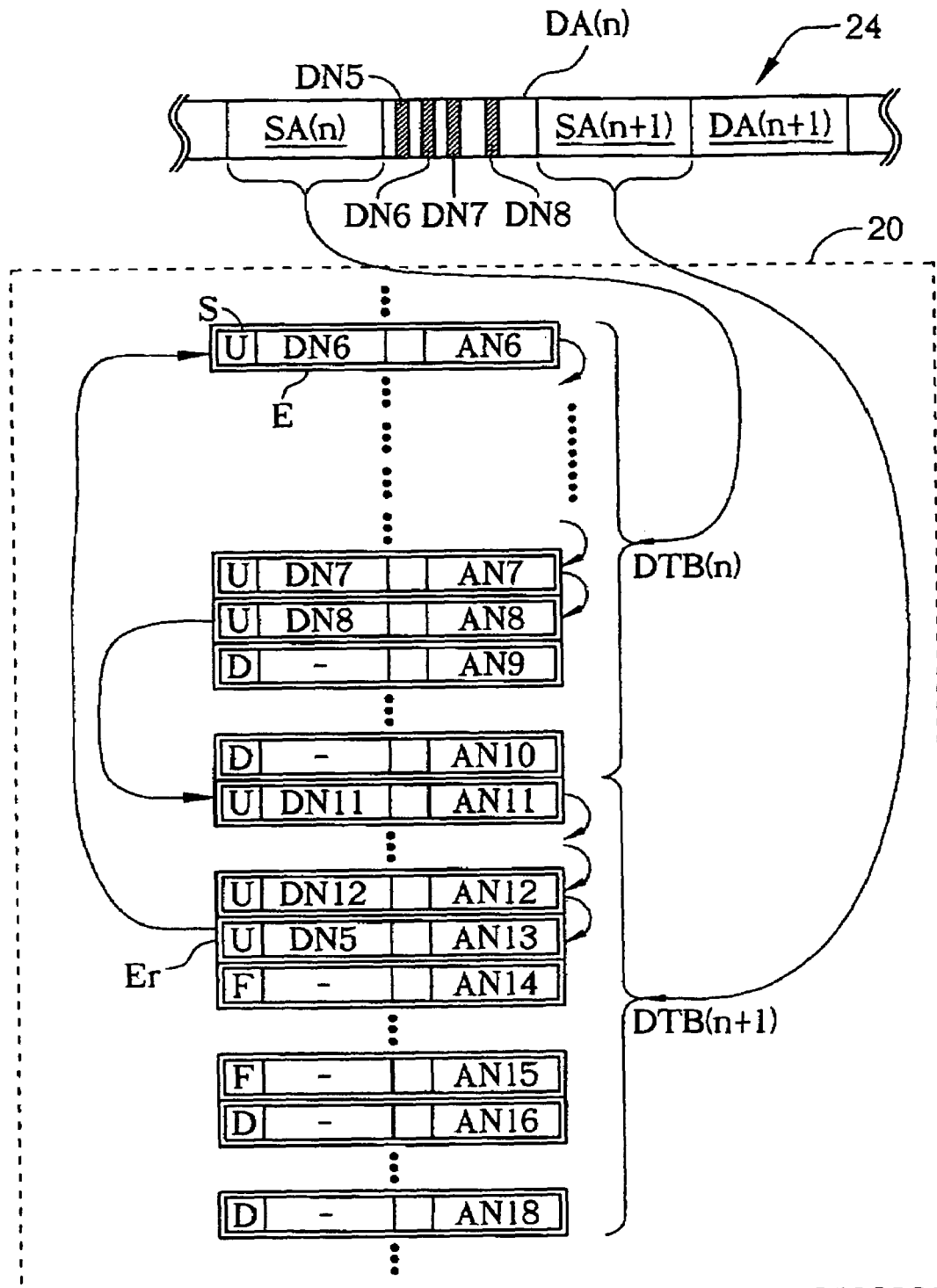
Figure 4C:
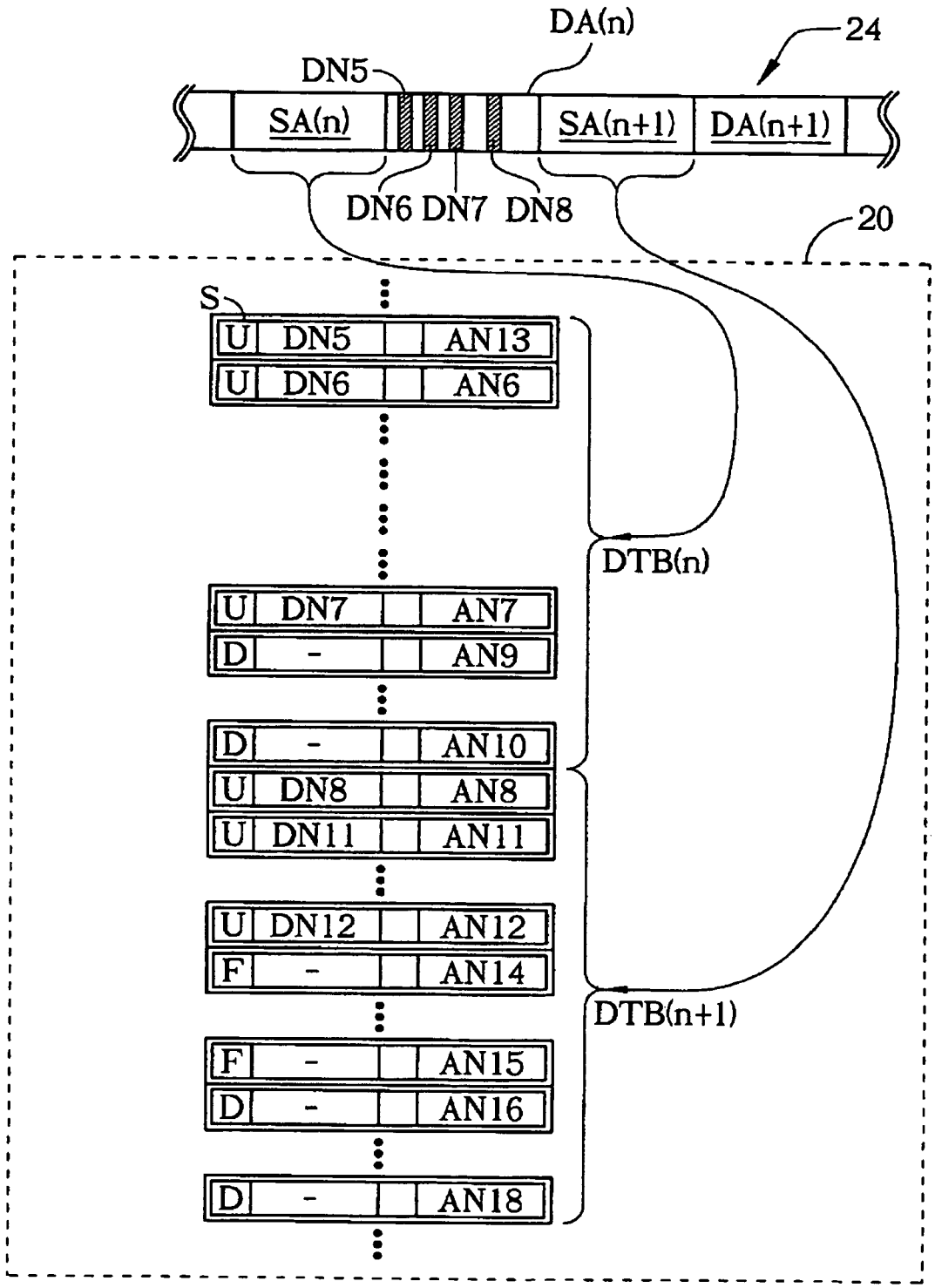

To facilitate elaboration and comparison, the present invention assumes the use of the optical disc drive 30 for data access on the optical disc 22. A track 24 is used for data storage on the optical disc 22 and the data format of the track 24 and the DT function similarly to the same prior art items shown in FIG. 2A and FIG. 2B. As with the prior art technology, while accessing data on the optical disc 22, the optical disc drive 30 temporarily loads the DT into the memory 40, and updates the DT accordingly. The method of this invention lies in management of the DT (while in temporary memory storage) during data write-in.

Figure 6:
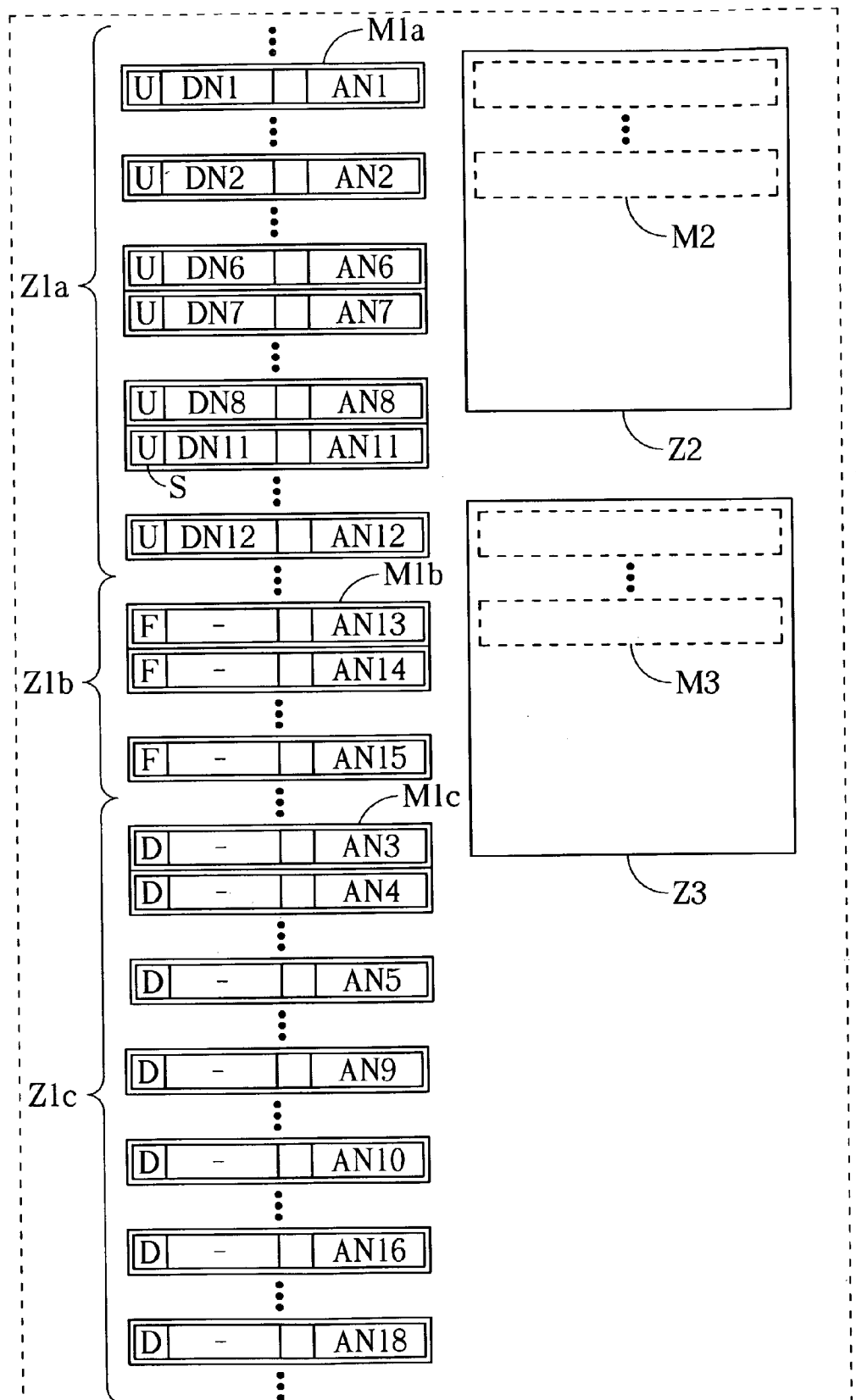
FIG. 6 illustrates how a Defect Table stores entries according to the present invention.

Please refer to FIG. 6 (in conjunction with both FIG. 2A, FIG. 2B and related elaborations), which illustrates how the present invention temporarily stores the DT (of FIG. 2B) in the memory 40 of the optical disc drive 30. Unlike the prior art technology, this method first allocates three memory areas (Z2 as the 2nd memory area and Z3 as the 3rd memory, with Z1 further divided into Z1a, Z1b, and Z1c ) in the memory 40 prior to loading and temporarily storing the DT. The memory areas Z1a, Z1b, and Z1c, along with Z2 and Z3 comprise a plurality of first memory blocks, as M1a in Z1a, M1b in Z1b, and M1c in Z1c. Each of the memory blocks M2 and M3 is utilized to temporary store a DT entry.

When the optical disc drive 30 reads the DT of the optical disc 22 into the memory 40, used-entries in every DTB (those with a status indicator "U") are stored in the first corresponding blocks of M1a in Z1a. Similarly, unused entries in every DTB (those with a status indicator "F") are stored in the corresponding blocks of M1b in Z1b, and all unusable entries in every DTB are stored in the corresponding blocks of M1c in Z1c. Comparing the DT of FIG. 2B with the entries temporarily stored in various memory blocks (as illustrated in FIG. 6), the prior art used entries in DTB(n−i),DTB(n), and DTB(N+1), comprising data block addresses of DN1,DN2,DN6,DN7, DN8 to DN11, and DN12, are all stored in the memory area Z1a. Unusable entries in every DTB are all stored together in the memory area Z1c and comprise the defective replacement data block addresses of AN3, AN4 to AN16, and AN18. In a real case scenario, the present invention is capable of directly reading every used-entry in the DT into the memory area Z1a. Since used-entries in the DT are sorted, it remains sorted after being read into memory area Z1a.

Please refer to FIG. 7A to FIG. 7E, which illustrates the process with which this invention updates the DT during data write-in. When the optical disc drive 30 starts accessing data on the optical disc 22, it loads the DT from the optical disc 22 into the memory 40 (as illustrated in FIG. 6), and stores the entries in accordance with their status indicator (as in used, free, or unusable entry) in Z1a, Z1b, and Z1c, respectively.

Figure 7A:
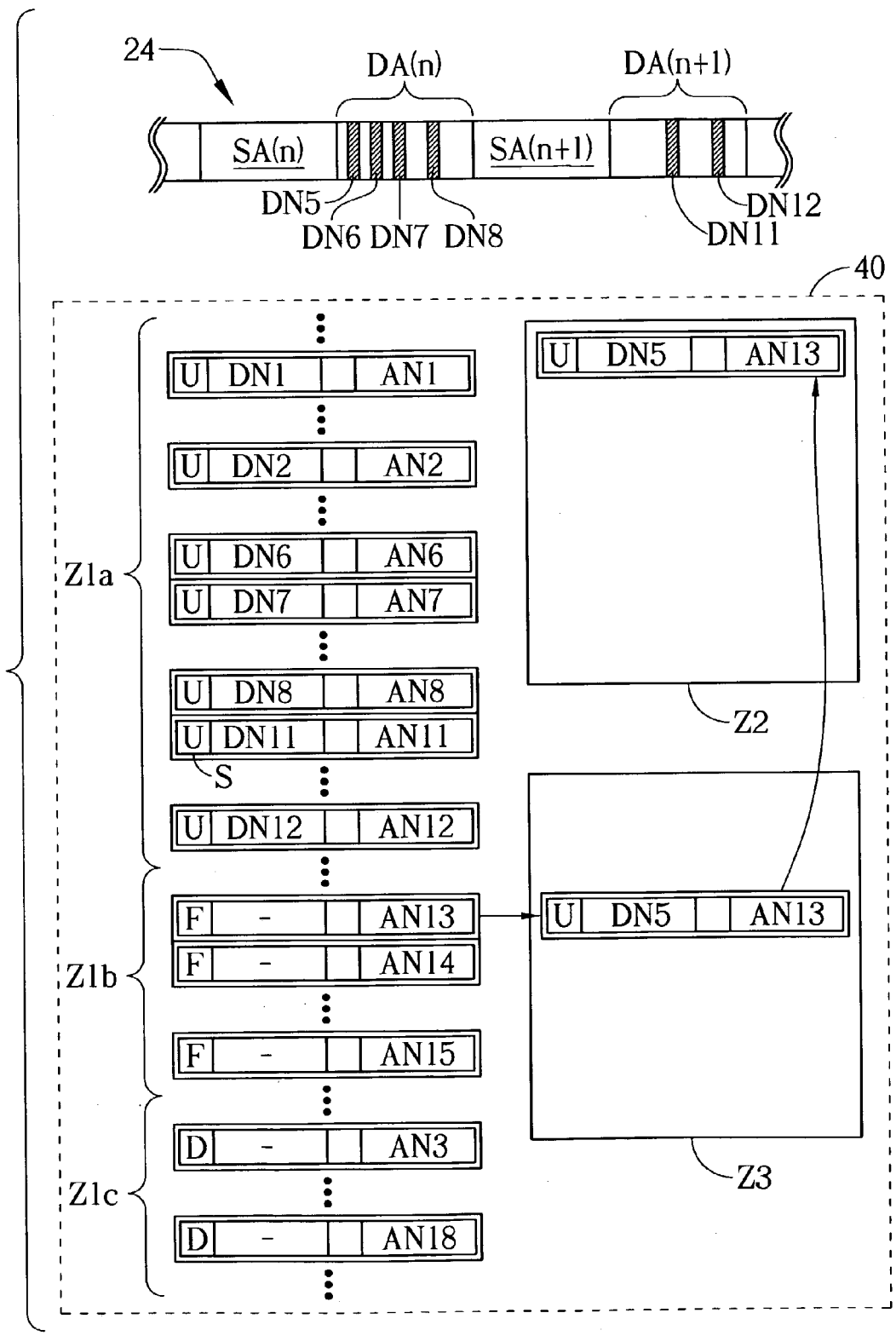
FIGS. 7A to 7E illustrate the process with which the memory of FIG. 5 implements a Defect Table update.

As illustrated in FIG. 7A, supposedly during a data write-in that the optical disc drive 30 discovers that a data block in DN5 of DA(n) is defective. The control circuit 38 locates an available spare data block (with the address AN13) by selecting from the usable entries in temporary Z1b storage and copies this usable entry into a memory block in the $3^{rd}$ memory area, Z3. When the optical disc drive 30 writes data onto this replacement data block AN13, it stores the address of DN5 in this entry in Z3 and changes it to a used-entry. The entry is subsequently copied to the temporary Z2 storage as illustrated in FIG. 7A, thus completing the operation for the DT update. Please notice that the used-entries in temporary storage both in the $2^{nd}$ memory area Z2 and in Z1a are not combined and sorted.

Figure 7B:
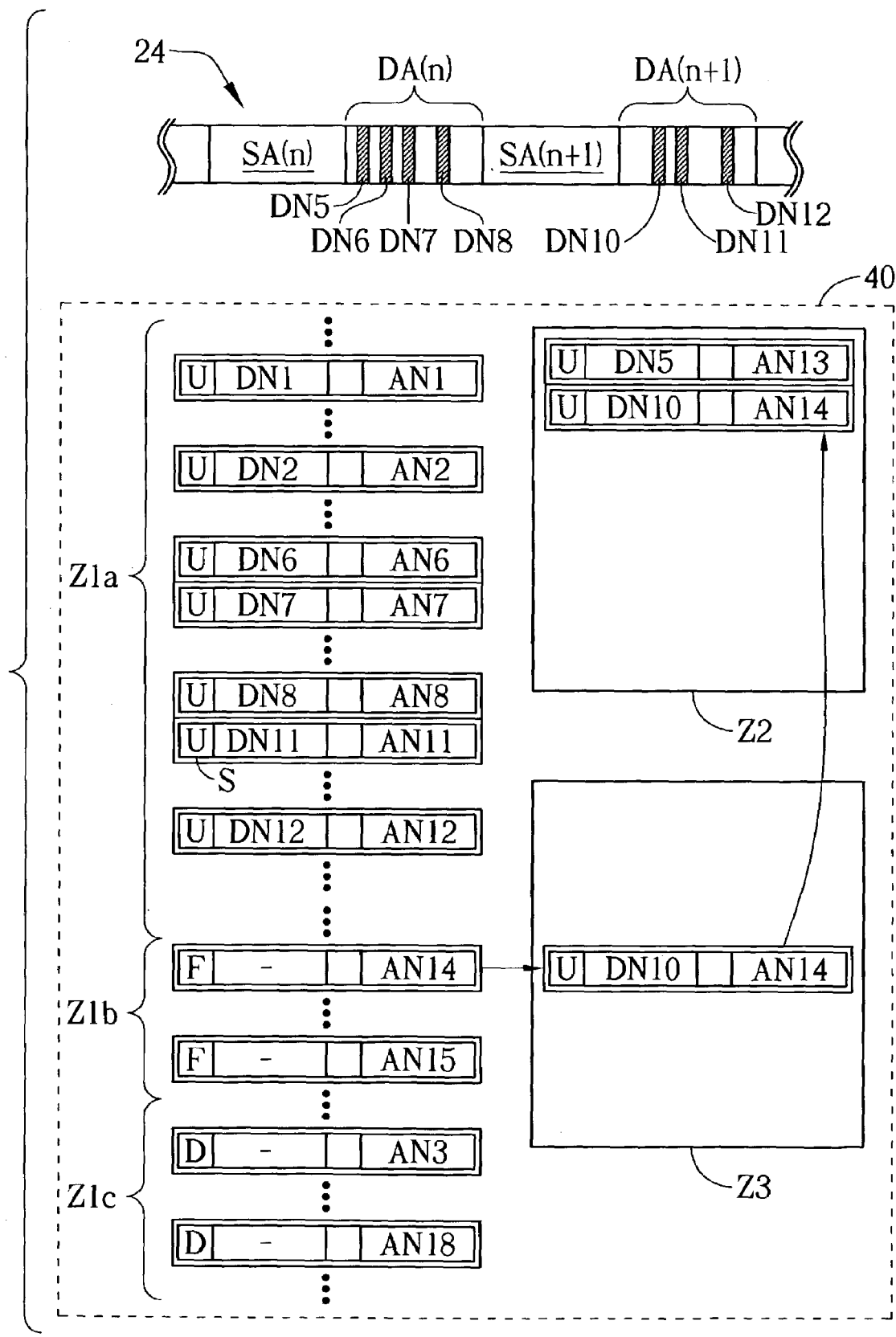

Please continue to refer to FIG. 7B. Assume that the optical disc drive 30 uncovers another defective data block in DN10 during write-in after storing the new entry in the DT concerning the defective data block in DN5. Again, the control circuit 38 tries to locate an available spare data block by searching for an unused entry in the temporary Z1b storage, followed by copying the unused entry into Z3. The memory space formerly occupied by another entry in the temporary Z3 storage in FIG. 7A is released upon completion of the defective data block management by copying it into Z2. Similar to the management in FIG. 7A, a spare data block in AN14 is located to replace the newly found defective data block, the entry gets changed to a used-entry, and the address of DN10 for the defective data block is stored in the entry. Finally, the new entry is copied to Z2 and is sorted with all the existing used entries in Z2 (including the newly established used-entry illustrated in FIG. 7A) according to their defective data block address. From the FIGS. 7A to 7B, the optical disc drive 30 uncovers two defective data blocks and establishes two new used-entries, which are in the temporary Z2 storage and sorted accordingly.

Figure 7C:
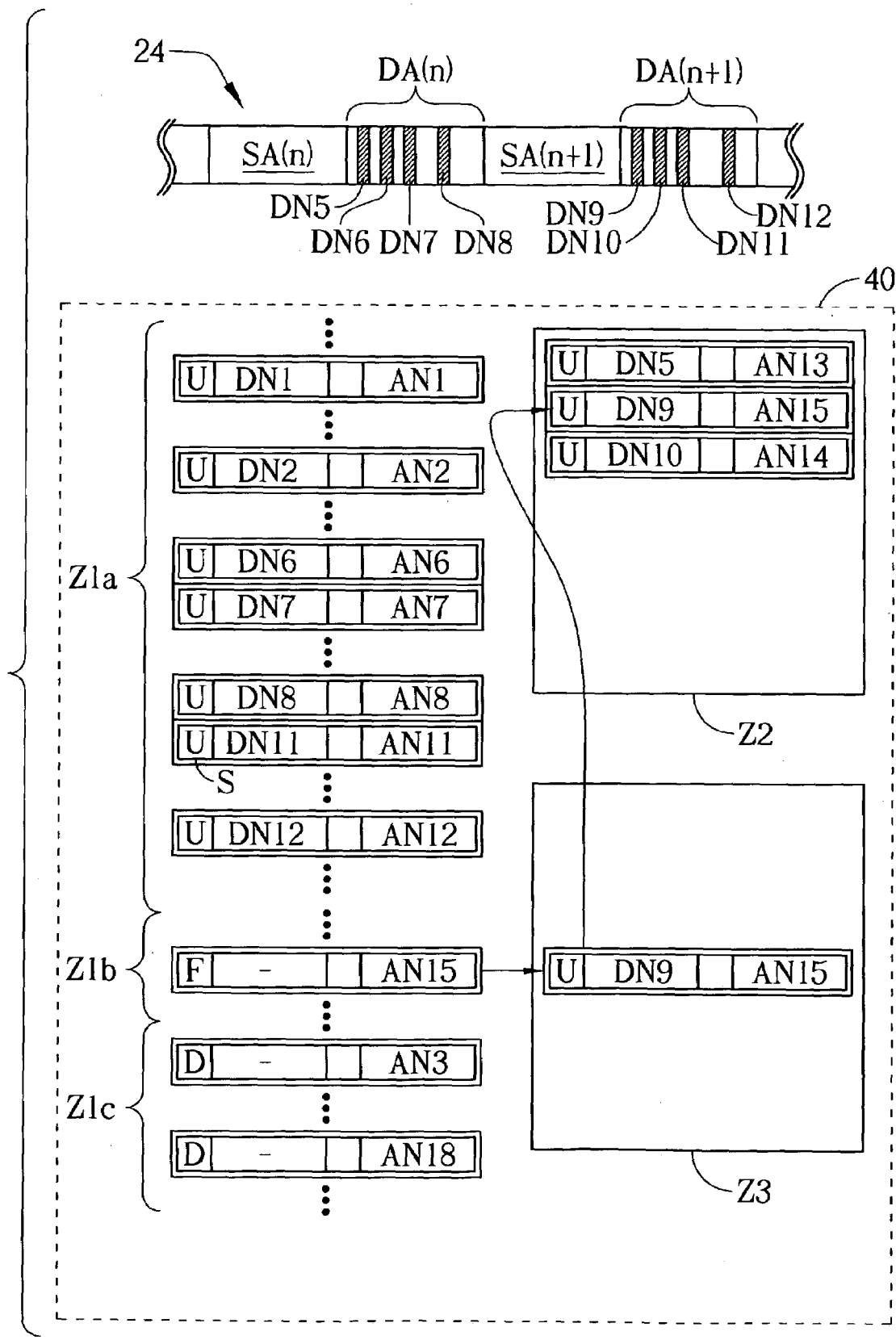
Figure 7D:
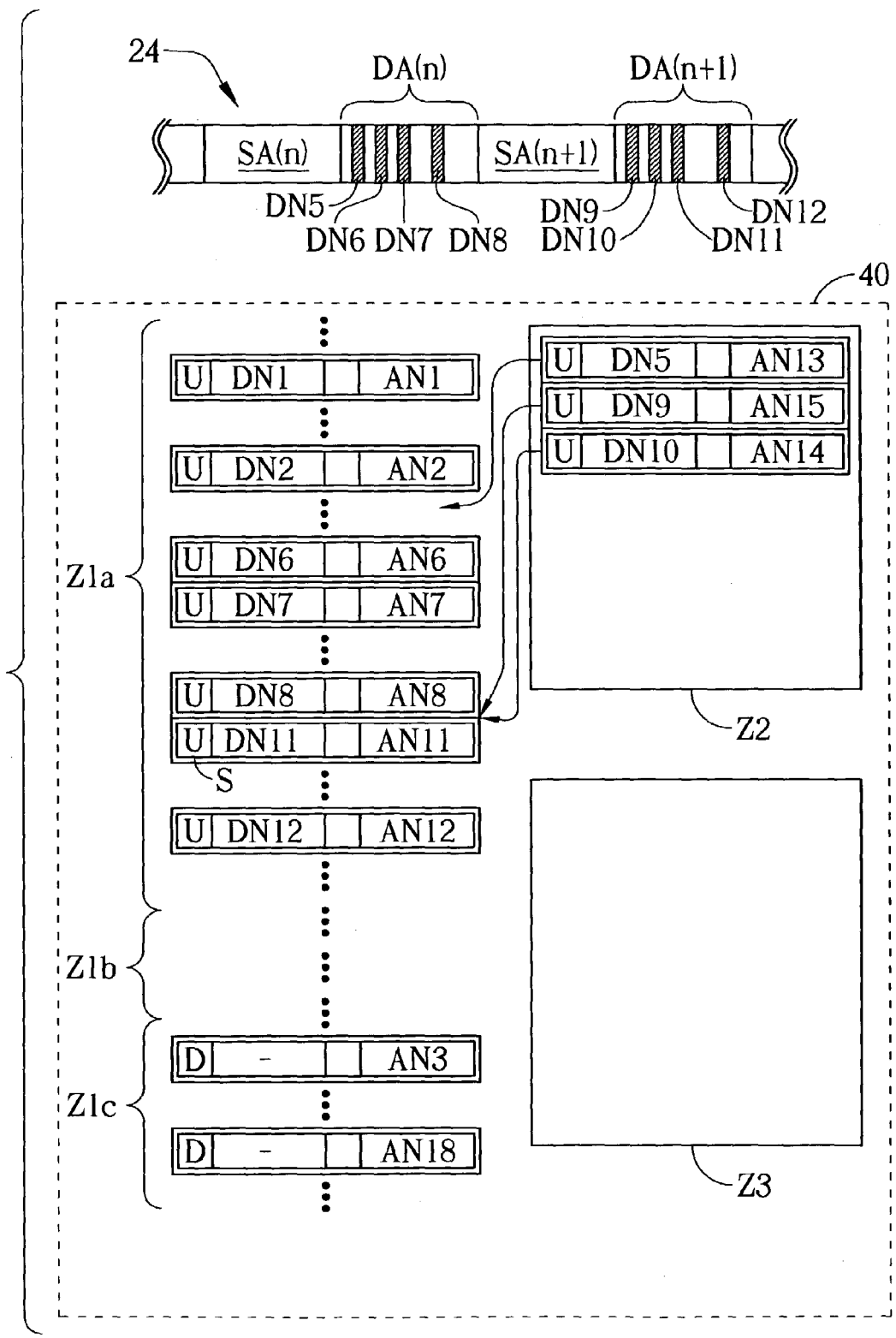

Assuming during a following data write-in onto the optical disc 22, the optical disc drive 30 again uncovers a defective user data block in DN9, as illustrated in FIG. 7C. Applying the same aforementioned method in dealing with the defective block DN9, the control circuit 38 searches the unused entries in Z1b to locate a replacement data block, and temporarily store this unused entry in Z3. Following the data write-in onto the replacement data block, this newly established used-entry is stored in a memory block in Z2 where a sorting takes place. Assuming DN10>DN9>DN5, the used-entry that stores DN10 is moved to another memory block during sorting, to make room for the used-entry that stores DN9, as illustrated in FIG. 7B. FIG. 7C illustrates the sorted used-entries in Z2 after the addition of the new entry.

Figure 7E:
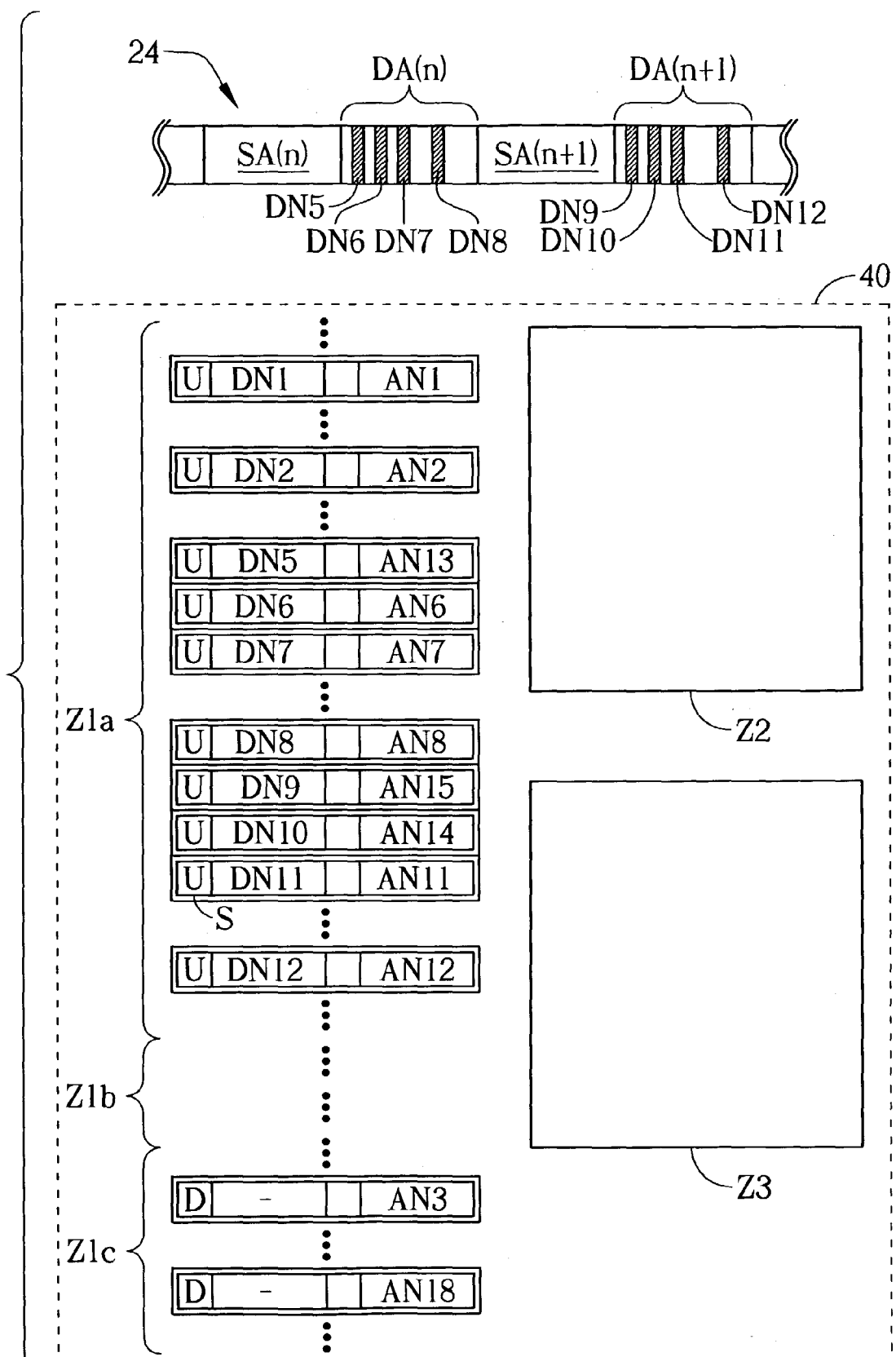

In other words, the present invention is about categorically storing a newly established used-entry in Z2 (temporarily) during a data write-in onto the optical disc 22, and sorting all new used-entries according to their defect data block addresses. However, these new used-entries remain separate (and unsorted) from their counterparts in Z1a. Only when the optical disc drive 30 stops writing data onto the optical disc 22 (as when ejecting the optical disc 22), the control circuit 38 combines the new used-entries in Z2 with the used-entries in Z1a. During the converging process, all of the used-entries in Z1a and Z2 re-sorted together. FIG. 7E illustrates the result of the re-sorting where every entry in Z1a, Z1b, and Z1c are placed in the original DTB updating the DT and written back onto the optical disc—thus completing the process for defect recording and management.

During the process illustrated in the FIG. 7A to FIG. 7C, an unused free entry is accessible directly from Z1b. If a certain replacement data block turns out to be defective during a data write-in, the newly established entry (now an unusable entry) that records the address of the defective replacement data block is marked as defective and stored directly back into Z1c. Since the unusable entries do not need sorting, they remain unsorted in the temporary Z1c storage. If during a data write-in, a plurality of new used-entries is established at the same time, all the new used-entries can be in the temporary Z3 storage, followed by a merging with the existing used-entries in Z2 for sorting.

Figure 8:
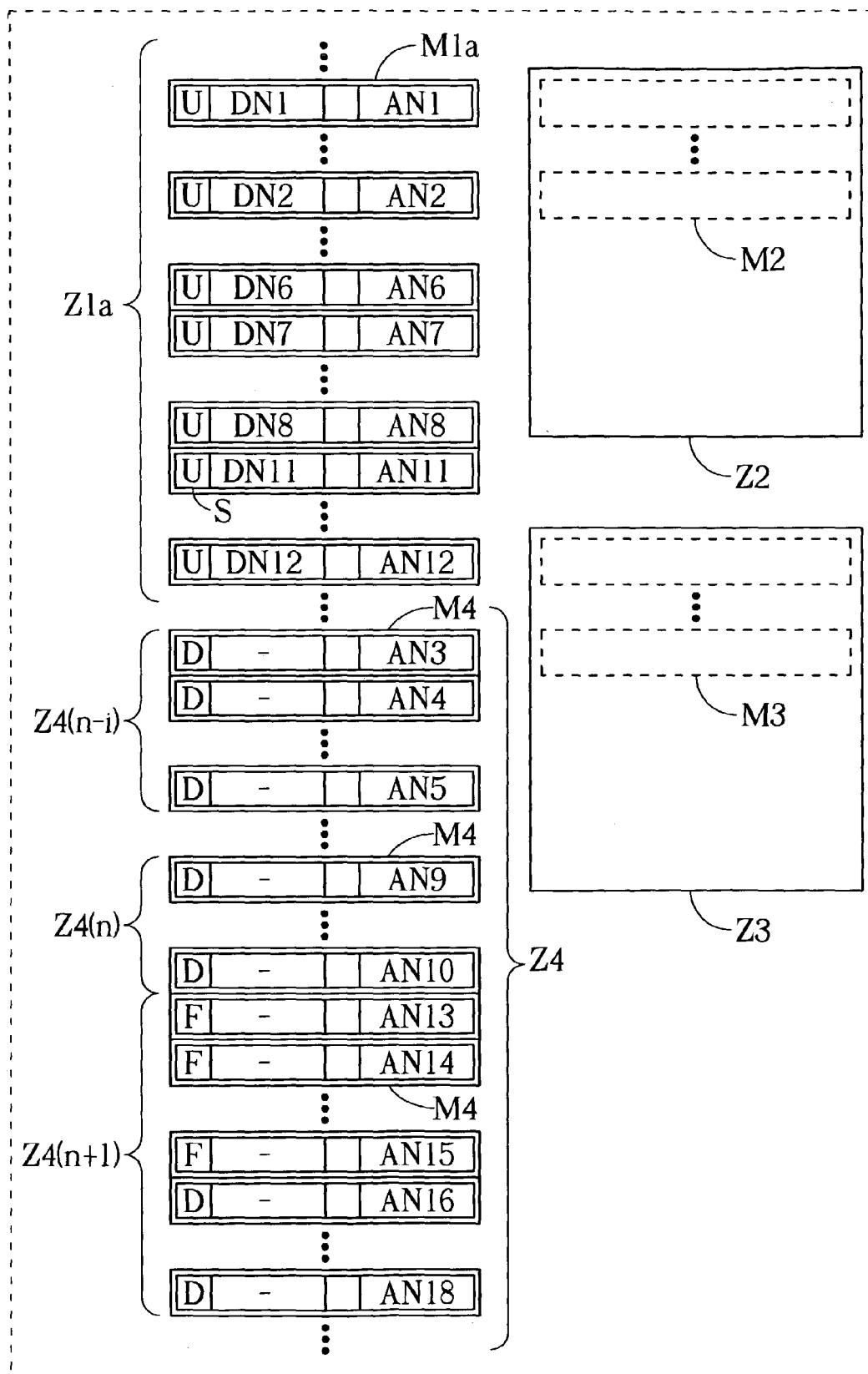
FIG. 8 illustrates how the Defect Table implements another implementation of the Defect Table according to the present invention.

In the above example, the memory areas Z1b and Z1c are used to store unused and unusable entries respectively. The present invention is capable of storing unused and unusable entries of every DTB in the DT directly into the memory 40 according to their original sequence. Please refer to FIG. 8 (in conjunction with FIG. 2B), which illustrates how the DT (of FIG. 2B) is read into the memory 40. Besides collecting the used-entries of every DTB and storing them in Z1a (a task similar to that in FIG. 6), each entry, unused entry, and unusable entry is stored in a memory block in M4 of Z4 according to their original sequence in a DTB. For example, all entries (with the exception of a used-entry) in the DTB(n−i) are temporarily stored in Z4(n−i), all entries (with the exception of a used-entry) in the DTB(n) are temporarily stored in Z4(n), and similarly all free and unusable entries in DTB(n+1) are temporarily stored in Z4(n+1). As for the used-entries in temporary Z1a storage, the use of Z2 and Z3 along with the temporary storage, the sorting of new used-entries during a data write-in, is identical with previous elaborations of the present invention and thus omitted here. In addition, when searching for a replacement data block, it is highly recommended that a replacement data block in the area surrounding the defective data block should take precedence. Therefore, by storing usable-entries into the memory 40 in the same configuration as that of a DTB (each DTB corresponds to a spare area), locating a near-by spare data block is facilitated.

In summary, the present invention works on the principle of storing (at the start of accessing data on an optical disc) the original DT (according to the status indicator of each entry in DT) from the disc into respective memory areas: Z1a, Z2a, and Z3a. During the optical disc 22 write-in, Z2 works as a buffer memory area to temporarily store all newly established used-entries.

In addition, in Z2 all new used-entries are sorted according to their defective data block addresses. Please notice that, with prior art technology every time a used-entry is established, precious system time goes into sorting all the used-entries in the DT along with the new used-entry, which in turn lowers the efficiency of a data write-in for the optical disc 22. In contrast, the present invention only sorts the new used-entries during a write-in without committing resources to sort all of the entries in the DT along with the new used-entries. The time required for memory operations is reduced, improving the efficacy of a data write-in for the optical disc 22. Only when the optical disc drive 30 concludes a data write-in process are all the new used-entries combined with their counterparts in the DT and re-sorted and written back onto the optical disc 22, thus completing a DT update. As a result, the present invention effectively reduces the operational burden of the memory 40 and the control circuit 38 in the optical disc drive 30, enhancing its overall efficiency during a data write-in.

Those skilled in the art will readily observe that numerous modifications and alterations of the method may be made while retaining the teachings of the invention. Accordingly, the above disclosure should be construed as limited only by the metes and bounds of the appended claims.

What is claimed is:

1. A method for utilizing an optical disc drive to manage data on an optical disc, the optical disc comprising a defect table and a plurality of data blocks for recording data, each of the data blocks having a corresponding unique address, the defect table comprising at least one entry, each of the entries being used to record the address of a corresponding defective data block on the optical disc, and the optical disc drive comprising a memory, the memory comprising a plurality of memory areas, each of the memory areas being utilized to store one of the entries, wherein when the optical disc drive writes data onto the optical disc, the optical disc drive is capable of detecting the defective data blocks of the optical disc, the method comprising:

allocating at least one first memory area in the memory, and storing a corresponding entry of the defect table in each of the first memory areas;

storing the address of a first data block of the optical disc in an original second memory area of the memory before data is written in the first data block if the first data block is defective and if there is at least one address, which is greater than the address of the first data block, recorded in the defect table, wherein the second memory area is different from the first memory area; and during a data write-in operation, preserving an initial order of the first memory areas in the memory when the address of the first data block is stored into the second memory area.

2. The method of claim 1 wherein when the address of the first data block is stored in the second memory area, a number of times needed to modify the entries stored in the first memory areas is less than a number of entries in the defect table having addresses greater than the address of the first data block.

3. The method of claim 1 further comprising: storing the address of a second data block of the optical disc in another second memory area when the second data block is defective.

4. The method of claim 3 further comprising: restoring the address of the first data block in another second memory area and releasing the original second memory area if the address of the second data block is less than the address of the first data block.

5. The method of claim 1 further comprising:
when the optical disc drive stops writing data onto the optical disc, storing an address stored in a first memory area into another memory area of the memory if the address of the first data block stored in the second memory area is less than the address stored in the first memory area.

6. The method of claim 1 further comprising: updating the defect table according to the addresses stored in the first memory areas and the second memory area, and writing the updated defect table in the optical disc when the optical disc drive stops writing data onto the optical disc.

7. The method of claim 1 wherein the data blocks and the defect table are established according to a specification of CD-MRW (Compact Disc-Mount Rainier reWritable).

8. The method of claim 1 wherein the optical disc further comprises a plurality of spare data blocks for recording data, which are prepared for the defective data areas, each of the spare data blocks has a corresponding address, and each of the entries of the defect table is also used to record the address of a corresponding spare data block.

9. A method for using an optical disc drive to manage data on an optical disc, the optical disc comprising a defect table and a plurality of data blocks for recording data, each of the data blocks having a corresponding unique address, the defect table comprising at least one entry, each of the entries being used to record the address of a corresponding defective data block on the optical disc, and the optical disc drive comprising a memory, the memory comprising a first memory area and a second memory area capable of storing a plurality of the entries, wherein when the optical disc drive writes data onto the optical disc, the optical disc drive is capable of detecting the defective data blocks of the optical disc, the method comprising:
storing the defect table in the first memory area;
storing the address of a first data block in the second memory area before data is written in the first data block if the first data block is defective;
storing the address of a second data block in the second memory area and sorting the addresses both of the first data block and the second data block if the second data block is defective; and
when the optical disc drive stops writing data onto the optical disc, sorting the addresses both of the first data block and the second data black according to the sorting order of the defect table stored in the first memory area, and updating the defect table according to the sorted address stored in the memory.

10. The method of claim 9 wherein the data blocks and the defect table are established according to a specification of CD-MRW (Compact Disc-Mount Rainier reWritable).

11. A method for using an optical disc drive to manage data on an optical disc, the optical disc comprising a defect table and a plurality of data blocks for recording data, each of the data blocks having a corresponding unique address, the defect table at least recording the address of a corresponding defective data block on the optical disc, and the optical disc drive comprising a memory having a first memory area and a second memory area, wherein when the optical disc drive writes data onto the optical disc, the optical disc drive is capable of detecting the defective data blocks of the optical disc, the method comprising:
storing the defect table in the first memory area;
storing the addresses of the defective data blocks, which are detected by the optical disc drive while the optical disc drive writes data onto the optical disc, in the second memory area, and sorting the addresses stored in the second memory area; and
when the optical disc drive stops writing data onto the optical disc, combining the addresses of the defect table stored in the first memory area with the addresses stored in the second memory area so as to update the defect table, and writing the updated defect table in the optical disc.

12. The method of claim 11 wherein the data blocks and the defect table are established according to a specification of CD-MRW (Compact Disc-Mount Rainier reWritable).

13. A method for utilizing an optical disc drive to manage data on an optical disc, the optical disc comprising a defect table, a plurality of data blocks for recording data and a plurality of spare blocks, each of the data blocks and the spare blocks having a corresponding unique address, the defect table comprising a plurality of entries, each of the entries being utilized to record the address of a corresponding defective data block on the optical disc or being set as a defective entry corresponding a defective spare block on the optical disc, the optical disc drive comprising a memory having a plurality of memory areas, wherein when the optical disc drive writes data onto the optical disc, the optical disc drive is capable of detecting defective data blocks of the optical disc, the method comprising:
allocating at least one first entry in a first memory area of the memory, and storing a corresponding entry of the defect table in each of the first entry in the first memory area;
storing the address of a specific data block of the optical disc in a second entry of a second memory area of the memory before data is written into the specific data block if the specific data block is found defective and if there is at least one address, which is greater than the address of the specific data block, recorded in the defect table, wherein the second memory area is different from the first memory area;
during a data write-in operation, if a spare block assigned to store data originally to be written in the specific data block is found defective, setting the second entry storing the address of a specific data block as a defective entry, and then storing the second entry to the first memory area without performing a sorting operation.

* * * * *